(12) United States Patent
Meiyappan (10) Patent No.: US 9,559,793 B2
(45) Date of Patent: Jan. 31, 2017

(54) WIRELESS DEVICE TEST STATION CALIBRATION

(71) Applicant: MICROSOFT TECHNOLOGY LICENSING, LLC, Redmond, WA (US)

(72) Inventor: Palaniappan Meiyappan, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 687 days.

(21) Appl. No.: 13/660,881

(22) Filed: Oct. 25, 2012

(65) Prior Publication Data

US 2014/0122009 A1    May 1, 2014

(51) Int. Cl.
*G01R 35/00* (2006.01)
*G06F 19/00* (2011.01)
*H04B 17/14* (2015.01)
*H04B 17/00* (2015.01)

(52) U.S. Cl.
CPC .......... *H04B 17/14* (2015.01); *H04B 17/0085* (2013.01)

(58) Field of Classification Search
CPC ..... H04B 17/0085; H04B 17/14; H04B 17/00; G01R 35/00; G06F 19/00
See application file for complete search history.

(56) References Cited

U.S. PATENT DOCUMENTS

| | | | |
|---|---|---|---|
| 4,815,986 A * | 3/1989 | Dholoo | 439/248 |
| 6,184,829 B1 | 2/2001 | Stilp | |
| 7,061,254 B1 * | 6/2006 | Shoulders | G01R 35/005 324/601 |
| 7,672,668 B2 | 3/2010 | Ding et al. | |

(Continued)

OTHER PUBLICATIONS

"Operating Manual, Power Sensor Module, R&S NRP-Z27, R&S NRP-Z37", Published on: Feb. 19, 2011, Available at: http://www.rohde-schwarz.com/en/manual/r-s-nrp-z27 -r -s-nrp-z37 -operating-manual-manuals- gb1_78701-29203.html, 86 pages.*

(Continued)

*Primary Examiner* — John Breene
*Assistant Examiner* — Mohammad Islam
(74) *Attorney, Agent, or Firm* — Gregg Wisdom; Judy Yee; Micky Minhas (57) ABSTRACT

Embodiments for calibrating a radiofrequency (RF) test station with a portable RF test station calibration device are disclosed. In one example, a portable RF test station calibration device comprises an RF power meter, a power sensor, and a computing device. The computing device may be configured to connect to the RF test instrument and to the RF power meter. The computing device may further comprise instructions executable by a logic subsystem to control the RF test instrument to transmit one or more RF signals having requested transmission values, receive measured transmission values from the RF power meter, determine a difference between the requested transmission values and the measured transmission values, and send a calibration value to the RF test instrument to be stored at the RF test instrument, the calibration value derived from the difference between the requested transmission values and the measured transmission values.

16 Claims, 7 Drawing Sheets

(56) References Cited

U.S. PATENT DOCUMENTS

| | | | |
|---|---|---|---|
| 8,145,127 B2 | 3/2012 | Nory et al. | |
| 2003/0002452 A1 | 1/2003 | Sahota | |
| 2005/0212541 A1* | 9/2005 | Ruff | G01R 1/06788 324/755.02 |
| 2008/0144707 A1* | 6/2008 | Tsfati | H04B 17/13 375/224 |
| 2009/0072838 A1* | 3/2009 | Shepherd | H04B 3/46 324/537 |
| 2009/0298440 A1* | 12/2009 | Takeya | H01Q 1/243 455/67.14 |
| 2010/0073220 A1* | 3/2010 | Olesen | H04B 17/21 342/174 |
| 2011/0124364 A1* | 5/2011 | Donovan | H04B 17/13 455/522 |
| 2011/0136449 A1* | 6/2011 | Zhu | H04B 17/102 455/115.2 |
| 2011/0301905 A1* | 12/2011 | Gregg et al. | 702/106 |
| 2012/0053879 A1* | 3/2012 | Chang | G01C 19/00 702/104 |
| 2012/0287792 A1* | 11/2012 | Nickel | G01R 1/06772 370/241 |
| 2013/0178203 A1* | 7/2013 | Venkataraman | H04W 4/16 455/423 |
| 2013/0187674 A1* | 7/2013 | Rada | G01R 35/005 324/750.02 |

OTHER PUBLICATIONS

"Agilent Technologies' TS-50 RF Shielded Test Fixtures—Test Fixture Solutions for Mobile Phones and RFIWireless Devices", Published on: Jun. 14, 2000, Available at: http://cp.literature.agilent.com/litweb/pdf/5968-6858E.pdf, 8 pages.*

"R&S FSMR Measuring Receiver Product Brochure", Rohde & Schwarz, http://cdn.rohde-schwarz.com/pws/dl_downloads/dl_common_library/dl_brochures_and_datasheets/pdf_1/FSMR_Bro_en.pdf, published Aug. 2011.*

R&S CMU 200,Universal Radio Communication Taster,Jun. 16, 2004, 1100.4903.12-04 (2008).*

Mehta,A general measurement technique for determining RF immunity,Oct. 2005, p. 78-80.*

"One Box Testers for Wireless Mobile Test", Retrieved at <<http://www.home.agilent.com/agilent/editorial.jspx?cc=IN&lc=eng&ckey=843186&id=843186>>, Retrieved Date: Aug. 24, 2012, pp. 2.

"Test Set speeds calibration of wireless devices", Retrieved at <<http://news.thomasnet.com/fullstory/Test-Set-speeds-calibration-of-wireless-devices-481742>>, May 4, 2006, pp. 3.

"Fast Device Tune Technical Overview", Retrieved at <<http://wireless.agilent.com/rfcomms/news/viewarticle.aspx?aid=1&cid=8960%20Platform&hid=8960>>, Retrieved Date: Aug. 24, 2012, pp. 3.

"Test Equipment Calibration Services", <<http://www.custom-cal.com/Test_Equipment_Calibration.aspx?AspxAutoDetectCookieSupport=1>>, Retrieved Date: Aug. 24, 2012, pp. 3.

European Patent Office, International Search Report & Written Opinion of PCT/US2013/065950, Netherlands, Jan. 2, 2014, 12 Pages.

"Operating Manual, Power Sensor Module, R&S NRP-Z27, R&S NRP-Z37", Published on: Feb. 19, 2011, Available at: http://www.rohde-schwarz.com/en/manual/r-s-nrp-z27-r-s-nrp-z37-operating-manual-manuals-gb1_78701-29203.html, 86 pages.

"Agilent Technologies' TS-50 RF Shielded Test Fixtures—Test Fixture Solutions for Mobile Phones and RF/Wireless Devices", Published on: Jun. 14, 2000, Available at: http://cp.literature.agilent.com/litweb/pdf/5968-6858E.pdf, 8 pages.

* cited by examiner

WIRELESS DEVICE TEST STATION CALIBRATION

BACKGROUND

Wireless devices may be tested at a test station during manufacturing in order to ensure operation in accordance with various regulations and product safety requirements. In some cases, a testing process may be used to determine maximum settings for the wireless device, such as a maximum power level. However, some amount of uncertainty may be associated with the testing process. To help manage this uncertainty, the test station equipment may be periodically calibrated (e.g. once a day). However, the calibration process may be time-consuming, and also may itself include some level of uncertainty. Therefore, a maximum power level for a wireless device under test may be set at a lower level to compensate for the uncertainties in the testing and calibration processes.

SUMMARY

Embodiments are disclosed herein for calibrating a wireless device radiofrequency (RF) test station. For example, one disclosed embodiment provides a computing device of a portable RF test station calibration device that controls the RF test instrument to transmit one or more RF signals having requested transmission values. The computing device receives measured transmission values from the RF power meter and determines a difference between the requested transmission values and the measured transmission values. The computing device further sends a calibration value to the RF test instrument, the calibration value being derived from the difference between the requested transmission values and the measured transmission values.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Current methods of calibrating a test instrument of an RF test station may involve partial disassembly and reassembly of the RF test station, and therefore may take a potentially long time. Also, such calibration processes may involve inserting various devices into a signal path to measure losses, which may give rise to further uncertainties. In practice, a operator of a current RF test station calibrating apparatus may remove a panel from a shield box of the RF test station, disconnect various RF connections within the RF test station, connect a network analyzer to a portion of the signal path through the RF test station, and manually record loss for the portion of the signal path. This process may be performed separately for different portions of the signal path (e.g. a first path from the test instrument of the test station to a first probe connector, a second path from the test instrument to a second probe connector, and a third path through two probes and a device connected to the probes). Each loss testing process may involve rearrangement of RF connections to be performed by the operator.

After completing the loss measurements, the operator may convert the losses for each portion of the signal path to a format recognizable by the test instrument as a calibration offset, and control the test instrument to store the calibration offset. Then, an operator may return all connections to an initial state. The overall process may take an experienced technician on the order of twenty minutes to perform. As the calibration process is performed daily, the process may have a significant impact on test station throughput. Further, the network analyzer used to test the signal paths may be expensive.

Furthermore, such a test station calibration process may still result in an amount of uncertainty that may affect the testing of devices in the calibrated test station. For example, the wireless device test instrument power setting (transmitter and/or receiver) may have an accuracy of +/−1 dB. Likewise, the silicon chips used in a device under test may have an accuracy of +/−0.5 dB. Further, the VSWR (voltage standing wave ratio) of RF cables used in the test station may degrade these values further by +/−0.1 dB, for a total uncertainty of +/−1.6 dB. For this reason, a wireless RF device under test that is tested by such a system may have a maximum transmitter power that is reduced by this uncertainty range to ensure that the device does not exceed transmitter power limits. It will be noted that lower transmitter power may lead to reduced device range and throughput, which may impact a user experience.

Thus, embodiments are disclosed herein that relate to the calibration of wireless device test stations in an accurate, efficient and cost-effective manner Briefly, the disclosed embodiments utilize a portable RF test station calibration device that utilizes equipment already present in the RF test station in combination with precision power measurement devices to perform functions of a network analyzer. As explained below in more detail, the disclosed embodiments may allow a wireless RF test station to be calibrated without disassembly of the shield box or disconnection of the probes within the shield box. Further, the power measurement devices of the disclosed embodiments may have a significantly lower cost than a network analyzer.

Additionally, the disclosed embodiments may allow losses from the RF test instrument through the probes to be determined for each path independently, without the use of a device under test in the test station. This may help to achieve a significant reduction in uncertainty during calibration, as the uncertainty of the integrated circuits within the device under test is not present during calibration. To accomplish this, the disclosed embodiments utilize a calibration board having similar connectors as the device under test, but not having the integrated circuits of the device under test. The calibration board may be inserted into a RF test station in a similar manner as a device under test to allow the path losses and probe losses to be measured without disconnecting RF cables within the RF testing station. Maintaining RF cable connections and utilizing actual compressed air pressurized piston movements of an automated RF probe engagement mechanism in the RF test station allows losses to be calibrated as though an actual test of a device under test is being performed. Example embodiments of calibration boards and the use thereof are described in more detail below.

Figure 1:
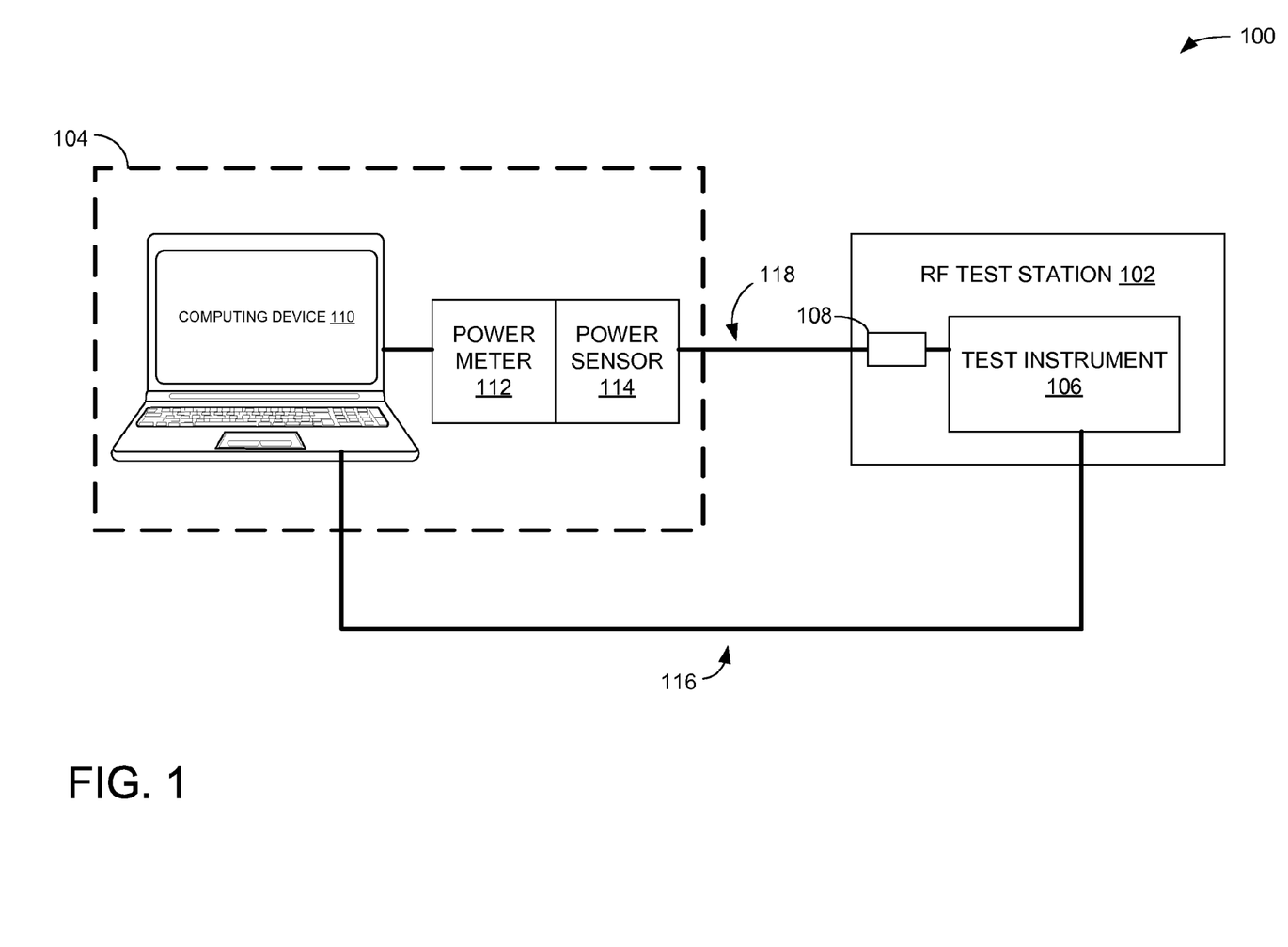
FIG. 1 shows a wireless device RF test station calibration environment in accordance with an embodiment of the present disclosure.

Turning now to FIG. 1, an RF test station calibration environment 100 is shown as including an RF test station 102 and a portable RF test station calibration device 104. RF test station 102 may be any suitable RF test station for testing and calibrating a plurality of different devices under test (DUTs). For example, RF test station 102 may be a wireless device RF test station configured to test and calibrate a wireless device to conform to one or more regulations. An example regulation may stipulate that a particular DUT does not exceed a maximum transmission power level. Therefore, RF test station 102 may include a test instrument 106 that transmits and receives an RF signal bi-directionally to the DUT and detects power levels transmitted by the DUT and power levels received at the DUT. RF test station 102 may then determine an adjustment to be applied to a maximum transmission power level stored at the DUT in order to ensure that the DUT meets the associated regulations. It will be understood that in RF test station calibration environment 100, a DUT may be replaced by calibration board 108.

Portable RF test station calibration device 104 may comprise a computing device 110, an RF power meter 112, and an RF power sensor 114. Computing device 110 may take any suitable form. For example, computing device 110 may comprise a portable computing device, such as a laptop computer, a notepad computer, a mobile device, etc. Computing device 110 may be connected to test instrument 106 via cable 116. Cable 116 may include any wired connection cable, including a Universal Serial Bus (USB) cable, Serial ATA (SATA) cable, FireWire cable, fiber optic cable, etc. Further, in some embodiments, computing device 110 may be connected to test instrument 106 via any suitable wireless connection.

Computing device 110 may control test instrument 106 to transmit one or more RF signals having requested transmission values. For example, computing device 110 may send instructions over cable 116 to control test instrument 106 to perform an RF signal sweep over a plurality of frequencies at one or more known transmission power levels. The RF signal may be transmitted in any suitable form and in accordance with any suitable protocol, including but not limited to continuous wave, modulated WLAN, Bluetooth, GPS, etc. The RF signal transmitted from test instrument 106 may be sent through calibration board 108 to power sensor 114 via cable 118. Cable 118 may be any suitable cable to allow power sensor 114 and power meter 112 to detect and measure transmission values of the RF signal transmitted from test instrument 106 through calibration board 108. For example, cable 118 may be an RF cable. In some embodiments, power sensor 114 may be integrated into power meter 112. In alternative embodiments, power sensor 114 may be communicatively coupled to power meter 112. Power meter 112 may be self-calibrated by utilizing a stored reference calibrated by a manufacturer of the power meter. Power meter 112 may also include a 50 MHz precision power source, and be configured to measure any suitable signal.

Computing device 110 may receive measured transmission values from power meter 112, such as a power level measured from the RF signals received at the power sensor. In some embodiments, test instrument 106 may detect and measure a power level to communicate to computing device 110. Computing device 110 may compare the measured power level to the known power level sent to test instrument 106 in order to determine a difference between the requested transmission values and the measured transmission values. Computing device 110 may determine a calibration value derived from the difference between the requested transmission values and the measured transmission values and send the calibration value to test instrument 106. Test instrument 106 may then store the calibration values as a calibration offset in order to increase the accuracy of test instrument 106. For example, test instrument 106 may store calibration values and/or the calibration offset in an IQ correction coefficients controller of the RF test station. Additionally, the calibration values may be stored at one or more third party computing devices that are connected to the RF test station. The test instrument may offset a transmission power level by an amount corresponding to updated calibration values and/or the calibration offset in order to increase accuracy of the test instrument.

Figure 2:
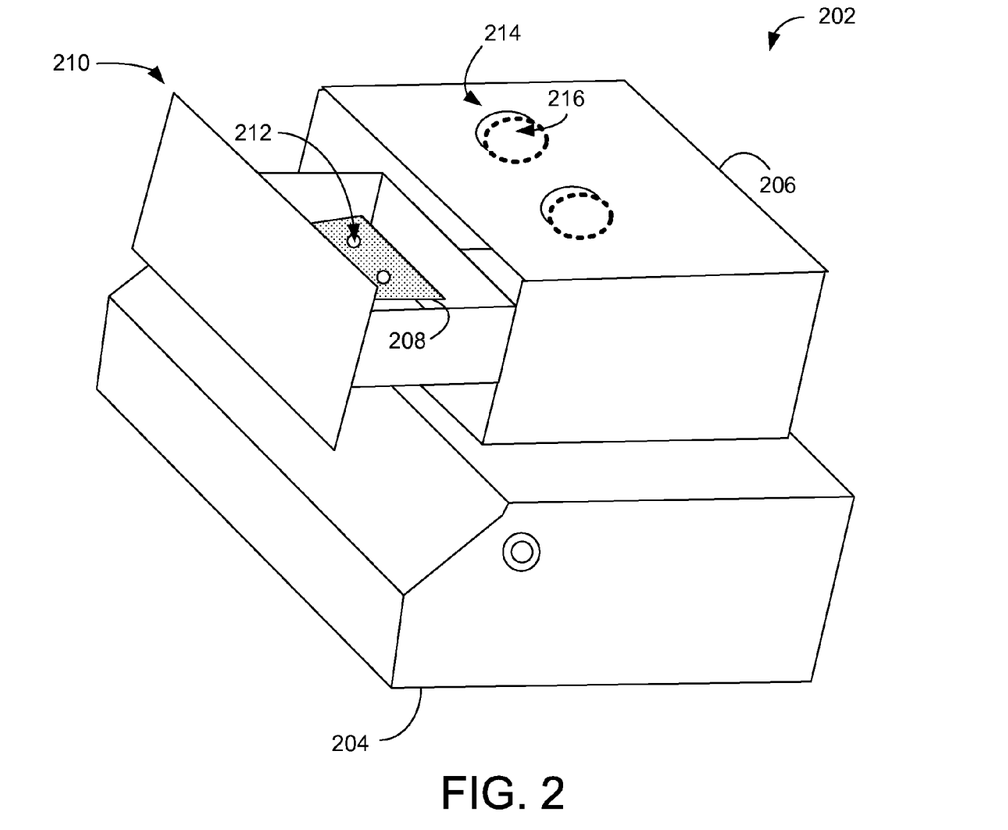
FIG. 2 shows a side perspective view of a wireless device RF test station in accordance with an embodiment of the present disclosure.

FIG. 2 shows a side perspective view of an RF test station 202 in accordance with an embodiment of the present disclosure. For example, RF test station 202 may correspond to RF test station 102 of FIG. 1. RF test station 202 may include a base 204. In some embodiments, one or more components of a test instrument, such as test instrument 106 of FIG. 1, may be housed in base 204, while in other embodiments one or more components may be housed separately. RF test station 202 may also include a shield box 206 configured to house a DUT and/or a calibration board, such as calibration board 208. Shield box 206 may be configured to reduce interference from signals outside of the test environment. Shield box may include various components to connect the test instrument to a DUT or calibration board. For example, shield box may include one or more RF probes configured to connect to RF connectors of a DUT or calibration board. Each of the RF probes may be connected to an attenuator to promote impedance matching. Each attenuator may be connected to a combiner through an RF cable. The combiner may be configured to combine one or more signals from the DUT and/or split a signal received from a test instrument. For example, the combiner may communicate with the test instrument through an RF cable.

Shield box 206 may include a drawer 210, which may be opened to allow access to the shield box. For example, an operator may open drawer 210 (e.g., by pressing a button on RF test station 202), insert calibration board 208 in a position corresponding to placement of a DUT, and close drawer 210 to reduce interference during calibration. By inserting a DUT or calibration board 208 into drawer 210, a connection may be formed between a test instrument and the DUT or calibration board 208 to allow performance of the testing and/or calibration.

As described in more detail below, calibration board 208 may include one or more connectors 212 that are positioned in a preselected location matching a connection location in the RF testing station to receive a cable from a power sensor. In some embodiments, the connection location may correspond to one or more holes 214 of shield box 206. For example, holes 214 may allow an operator to insert a cable into shield box 206 to connect an external device, such as power sensor 114 of FIG. 1, to calibration board 208. Holes 214 may comprise closeable lids 216 to preserve the interference shielding provided by shield box 206. Closeable lids 216 may have any suitable configuration for covering and/or exposing holes 214 to reduce interference experienced by the calibration board 108. For example, closeable lids 216 may be sliding, hinged, interlocking, etc. In some embodiments, a single closeable lid may be moved or deformed to cover and/or expose a plurality of holes 214. RF test station 202 may also include structures to guide a cable to connectors 212 on calibration board 208.

Figure 3:
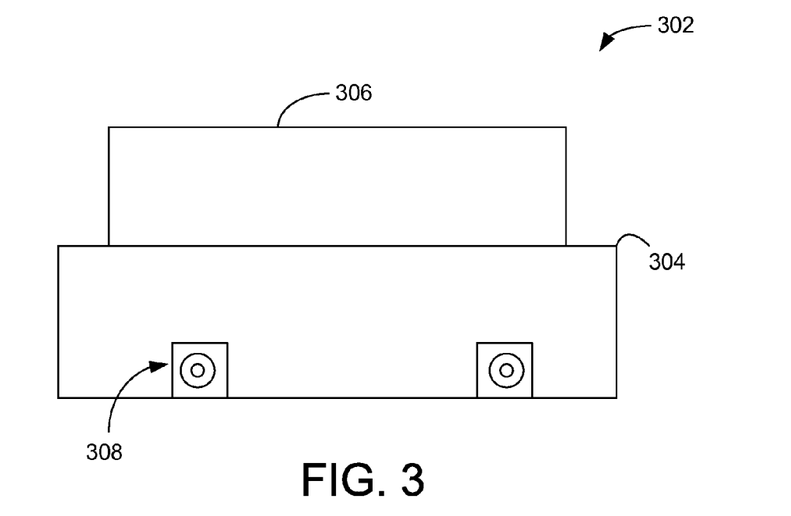
FIG. 3 shows a back perspective view of a wireless device RF test station in accordance with an embodiment of the present disclosure.

FIG. 3 illustrates a rear view of an RF test station 302 in accordance with another embodiment of the present disclosure. RF test station 302 includes a base 304, a shield box 306, and one or more connectors 308 integrated with the RF test station 302. Connectors 308 allow an external device to be connected to a calibration board, such as calibration board 208, without entering shield box 306. For example, an RF cable from a power sensor, such as power sensor 114 of FIG. 1, may be connected to connectors 308. Connectors 308 may be routed to calibration board 208 through base 304 and shield box 306 such that the calibration board is connected to the connectors when inserted into the shield box. Although shown in FIG. 3 to be positioned at a rear of RF test station 302, in some embodiments, connectors 308 may be positioned at any other suitable location of the RF test station.

Figure 4:
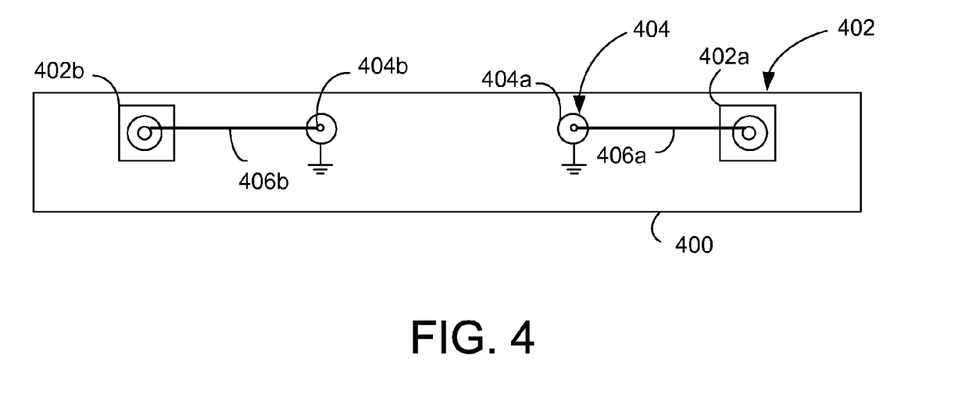
FIG. 4 shows a schematic depiction of a calibration board in accordance with an embodiment of the present disclosure.

FIG. 4 shows a calibration board 400 in accordance with an embodiment of the present disclosure. For example, calibration board 400 may represent an example configuration of calibration board 108 of FIG. 1 and/or calibration board 208 of FIG. 2. Calibration board 400 may include one or more RF connectors 402, such as RF connectors 402a and 402b. RF connectors 402 may be positioned in a location on calibration board 400 corresponding to a location of one or more RF connectors on a particular DUT that is to be tested by an RF test station. For example, an RF test station may be calibrated before testing a plurality of DUTs, the DUTs having RF connectors in a first location. Accordingly, a calibration board used for calibrating the RF test station before said testing may be configured to have a similar shape and/or size to the DUTs and to have RF connectors in the first location. By deriving all connector placements from a particular DUT, path loss may be measured for an associated DUT configuration without utilizing the DUT during calibration. Further, modeling the calibration board after a DUT may help to simplify design work when creating the calibration board.

Calibration board may include one or more connectors 404, such as blind mate connectors 404a and 404b. Blind mate connectors 404a and 404b may be connected to RF connectors 402a and 402b by traces 406a and 406b, respectively. Traces 406a and 406b may have an impedance of virtually any suitable value, such as 50Ω, 75Ω, 100Ω, etc. For example, a 50Ω trace may be routed from RF connector 402a with a switch to blind mate connector 404a. Blind mate connectors 404a and 404b may include self-alignment features that allow an operator to connect a cable to the calibration board without visual feedback. Blind mate connectors 404a and 404b may include any suitable type of blind mate connector, such as OSP connectors, OSSP connectors, etc.

Turning briefly back to FIG. 2, blind mate connectors 404a and 404b may line up with holes 214 in order to allow an operator to connect a cable from a power sensor to the calibration board through holes 214. Holes 214 may partially obstruct a view of connectors 404 and may not be sized to allow an operator to insert a hand and/or other tool into the shield box to secure the cable to connectors 404. Therefore, blind mate connectors 404a and 404b may allow an operator to connect the power sensor to the calibration board via the cable without such tools. In other embodiments, holes 214 may be sized large enough to admit a hand and/or other tool into the shield box. Therefore, connectors 404 may include connectors that permit fastening with such tools. For example, connectors 404 may be RF connectors, such as threaded RF connectors.

Figure 5:
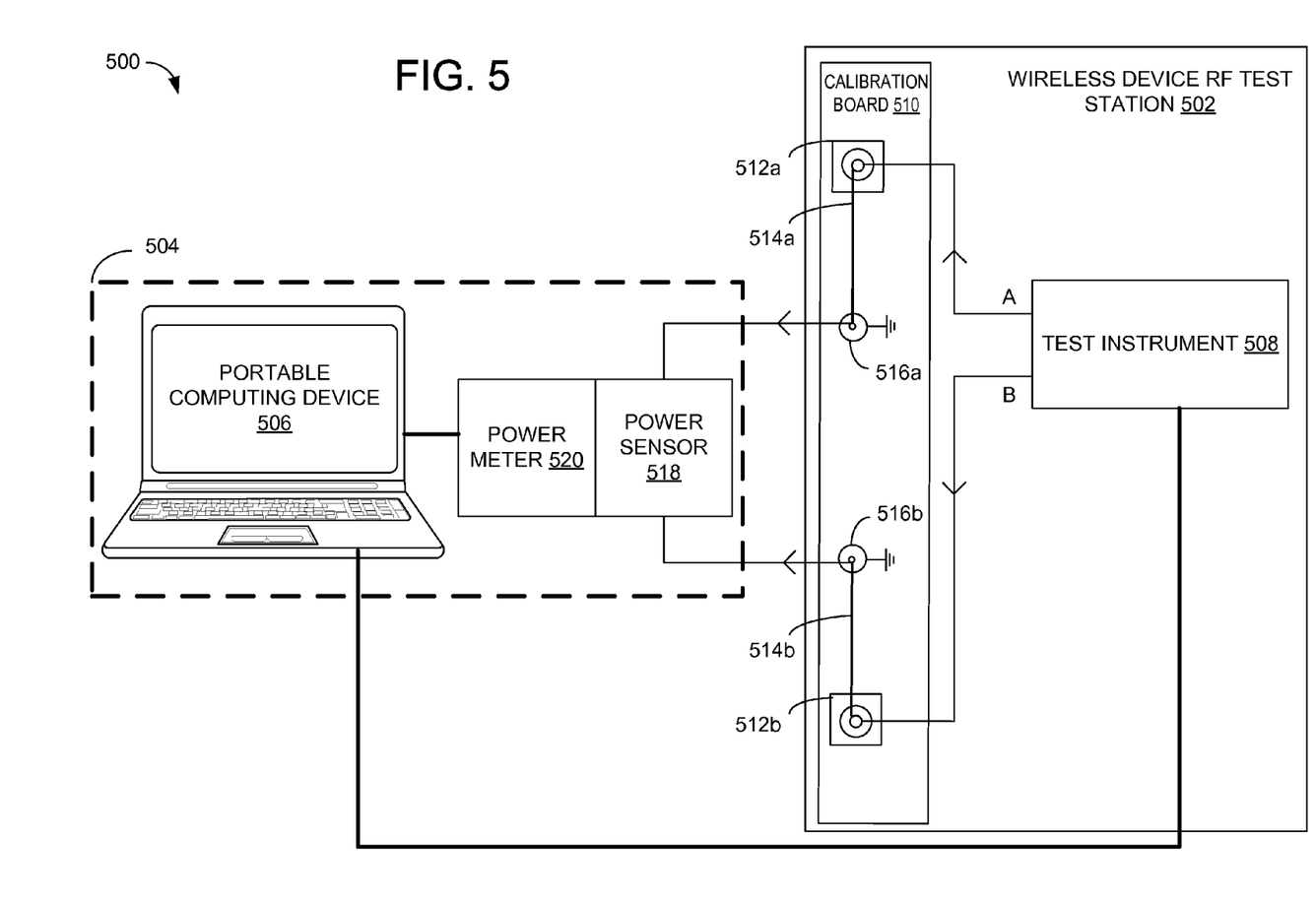
FIG. 5 shows RF signal paths through a wireless device RF test station calibration environment in accordance with an embodiment of the present disclosure.

FIG. 5 shows RF signal paths through a wireless device RF test station calibration environment 500 in accordance with an embodiment of the present disclosure. Wireless device RF test station calibration environment 500 includes a wireless device RF test station 502 and a portable RF test station calibration device 504, as described above with reference to test station calibration environment 100 of FIG. 1. One or more paths may extend from the RF test instrument to one or more RF connectors of the calibration board, then to one or more connectors of the calibration board, and then to a power sensor. For example, portable computing device 506 may be configured to control test instrument 508 to transmit a first RF signal along path A at requested transmission values, such as at one or more requested power levels and/or one or more requested frequencies. In response, test instrument 508 transmits the first RF signal along path A to calibration board 510. The first RF signal enters calibration board 510 at RF connector 512a and travels along trace 514a to connector 516a, which may be a blind mate connector. The first RF signal then enters power sensor 518 for detection, and measured transmission values for the first RF signal may be determined with power meter 520. The measured transmission values may be compared to the requested transmission values to determine a loss along path A.

A determination of loss along path B may be determined in a similar manner to the determination of loss along path A. For example, a second RF signal may be transmitted along path B from test instrument 508, to RF connector 512b of calibration board 510. The second RF signal may continue along trace 514b to connector 516b and finally to power sensor 518 so that measured transmission values may be determined by power meter 520. In some embodiments, the first path A may be tested independently from the second path B. In alternative embodiments, the first path A may be tested simultaneously with the second path B. For example, test instrument 508 may alternate transmissions along paths A and B. As another example, test instrument 508 may transmit an RF signal on each of paths A and B at the same time. Further, in some embodiments, test instrument 508 may transmit the same RF signal along each path. In alternative embodiments, the test instrument may transmit different RF signals along each path.

Figure 6A:
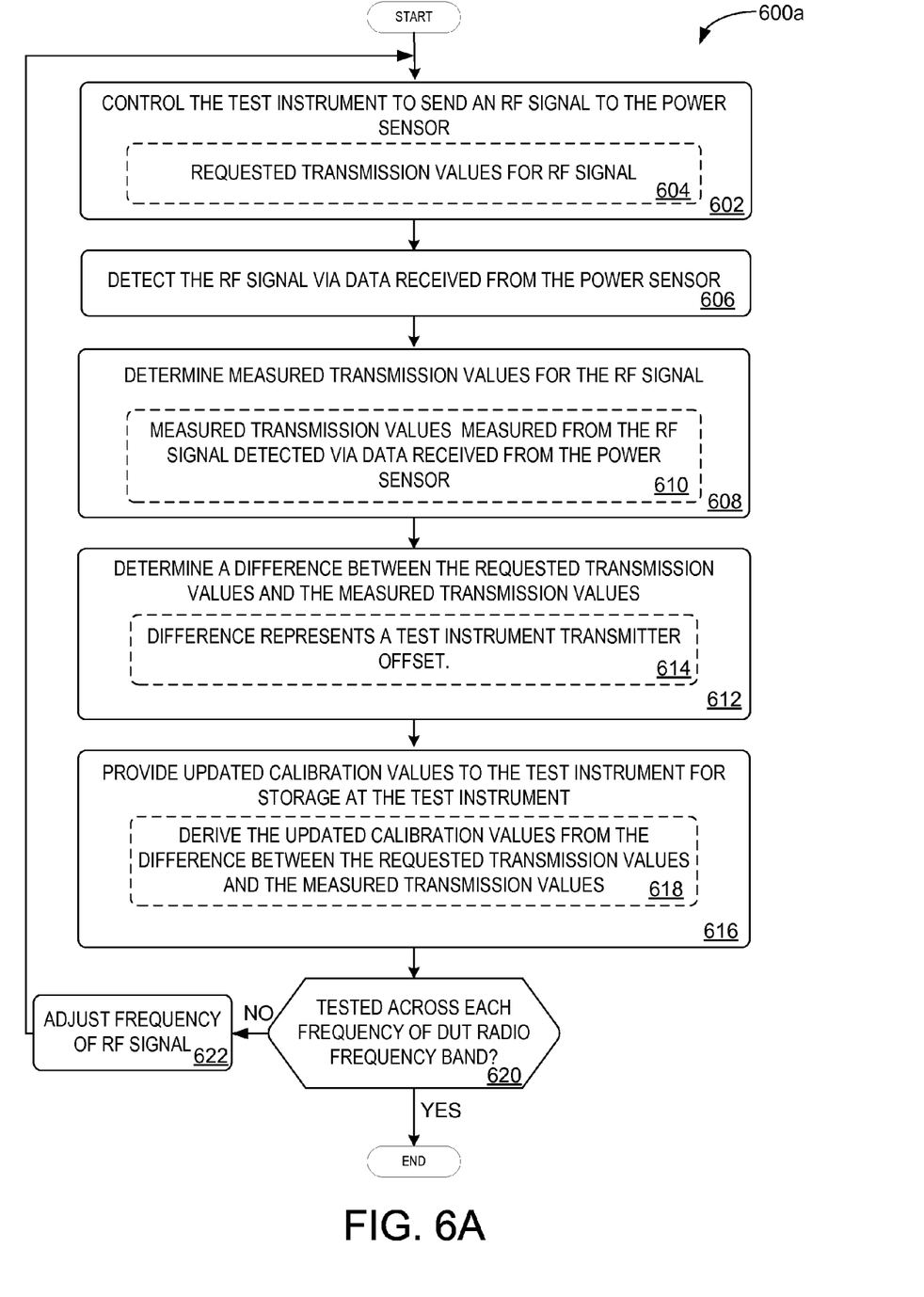
FIGS. 6A-6B show embodiments of methods of calibrating a test instrument of a wireless device RF test station with a computing device in accordance with the present disclosure.
Figure 6B:
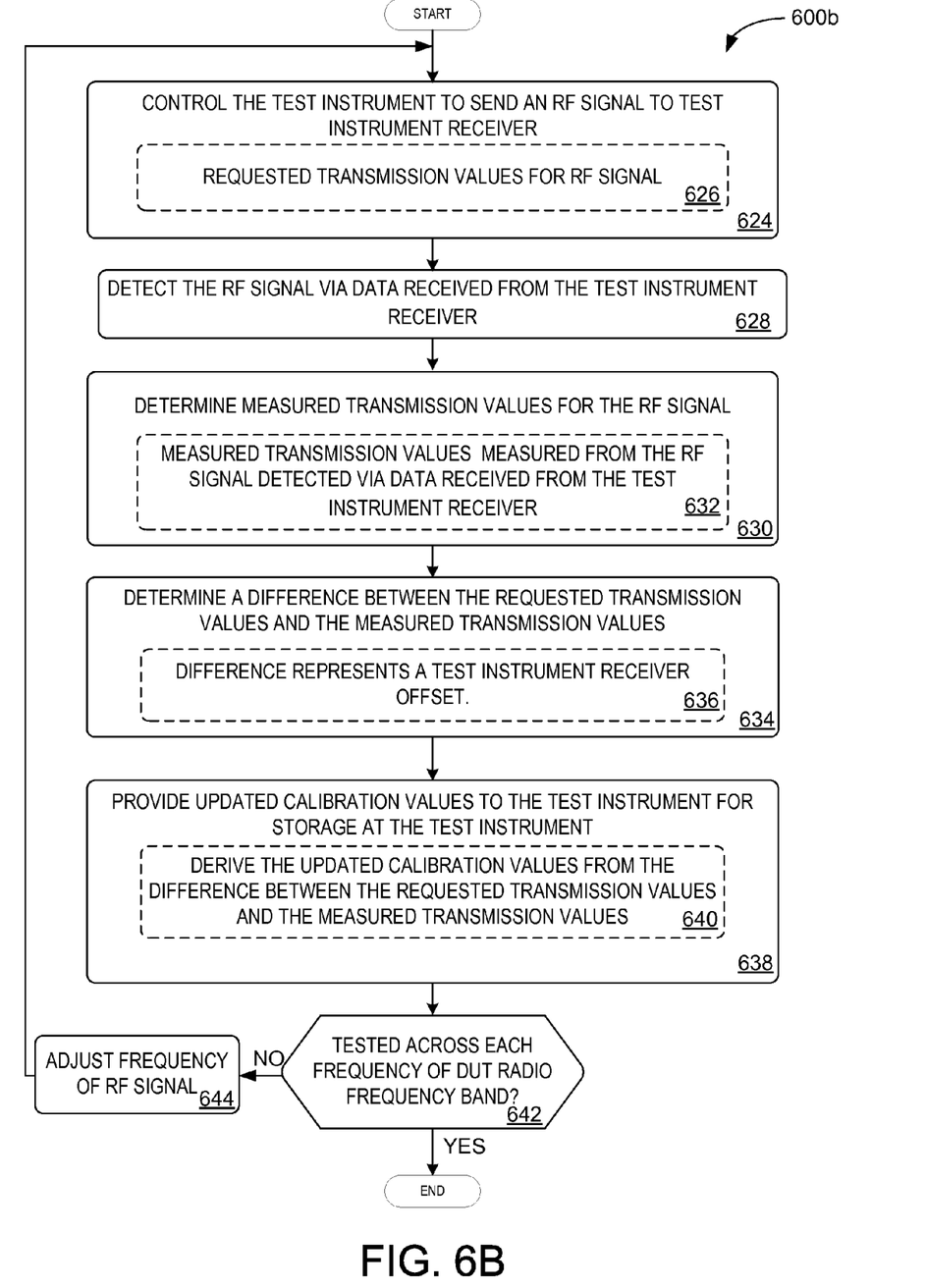

FIGS. 6A and 6B show embodiments of methods for calibrating a wireless device RF test station with a portable RF test station calibration device using different RF signal receivers. In particular, FIG. 6A shows an embodiment of a method for calibrating a transmitter of a test instrument of the wireless device RF test station by transmitting an RF signal from the transmitter of the test instrument to a power meter, while FIG. 6B shows an embodiment of a method for calibrating a receiver of the test instrument by sending an RF signal from the transmitter of the test instrument to the receiver of the test instrument. In some embodiments, the method shown in FIG. 6B may be performed after the method shown in FIG. 6A. As such, the transmitter of the test instrument may be calibrated with a self-calibrated power meter before using the transmitter to calibrate the receiver of the test instrument.

FIG. 6A shows an embodiment of a method 600a, implementable on a computing device of a portable RF test station calibration device, for calibrating a wireless device RF test station, such as those described with reference to FIGS. 1-5. Before performing method 600a, a test instrument transmitter may be connected to a power sensor by an operator. At 602, method 600a comprises controlling a test instrument to send an RF signal to the RF power sensor through a calibration board. As shown at 604, the RF signal may have requested transmission values. At 606, method 600a includes detecting the RF signal via data received from the power sensor, and at 608, determining measured transmission values for the RF signal. As shown at 610, the measured transmission values may be measured from the RF signal detected via data received from the power sensor.

At 612, method 600a includes determining a difference between the requested transmission values and the measured transmission values. As shown at 614, the difference determined at 612 represents a test instrument transmitter offset. At 616, method 600a includes providing updated calibration values to the test instrument for storage at the test instrument. For example, the computing device may create a file from path loss data in a format that is readable by the test instrument and send the file to the test instrument. As shown at 618, the updated calibration values may be derived from the difference between the requested transmission values and the measured transmission values. At 620, method 600a includes determining whether the test station has been tested across each frequency of the DUT radio frequency band. The DUT radio frequency band may represent the frequency band that the DUT is configured to operate and to which the DUT is configured to be calibrated. If the test station has not been tested across each frequency of the DUT radio frequency band, the frequency of the RF signal is adjusted at 622, and then method 600a returns to 602 in order to obtain accurate individualized calibration values at each frequency. Otherwise, if the test station has been tested across each frequency of the DUT radio frequency band, method 600a ends.

FIG. 6B shows an embodiment of a method 600b, implementable on a computing device of a portable RF test station calibration device, for calibrating a wireless device RF test station, such as those described with reference to FIGS. 1-5. Before performing method 600b, the computing device may be connected to a test instrument and a test instrument receiver may be connected to a test instrument transmitter. For example, a test instrument receiver may be connected to a test instrument transmitter that has been calibrated in accordance with method 600a, described in more detail above. At 624, method 600b comprises controlling a test instrument to send an RF signal to the test instrument receiver. As shown at 626, the RF signal may have requested transmission values. At 628, method 600b includes detecting the RF signal via data received from the test instrument receiver, and at 630, determining measured transmission values for the RF signal. As shown at 632, the measured transmission values may be measured from the RF signal detected via data received from the test instrument receiver.

At 634, method 600b includes determining a difference between the requested transmission values and the measured transmission values. As shown at 636, the difference determined at 634 represents a test instrument receiver offset. At 638, method 600b includes providing updated calibration values to the test instrument for storage at the test instrument. For example, the computing device may create a file from path loss data in a format that is readable by the test instrument and send the file to the test instrument. As shown at 640, the updated calibration values may be derived from the difference between the requested transmission values and the measured transmission values. At 642, method 600b includes determining whether the test station has been tested across each frequency of the DUT radio frequency band. If the test station has not been tested across each frequency of the DUT radio frequency band, the frequency of the RF signal is adjusted at 644, and then method 600a returns to 624 in order to obtain accurate individualized calibration values at each frequency. Otherwise, if the test station has been tested across each frequency of the DUT radio frequency band, method 600b ends.

Figure 7:
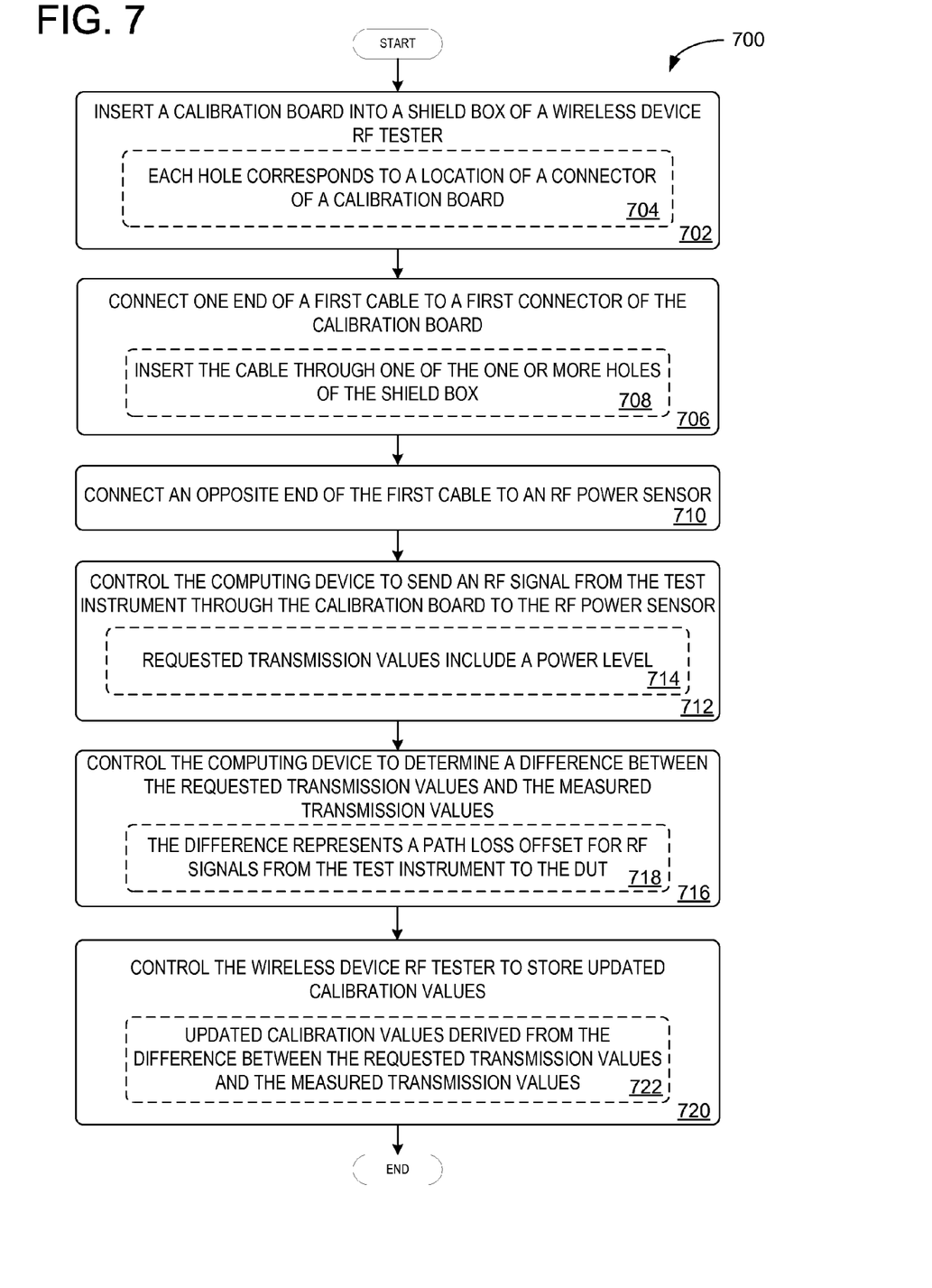
FIG. 7 shows a method of calibrating a test instrument of a wireless device RF test station with an operator in accordance with an embodiment of the present disclosure.

FIG. 7 shows an embodiment of a method 700 for an operator of a calibration system to calibrate a wireless device RF test station with a portable RF test station calibration device such as those described above with reference to FIGS. 1-5. At 702, method 700 includes inserting a calibration board inside a shield box of the wireless device RF test station. As shown at 704, the shield box may have one or more holes each corresponding to a location of a connector of a calibration board. At 706, method 700 includes connecting one end of a first cable to a first connector of the calibration board. As shown at 708, connection may be performed by inserting the cable through one of the one or more holes of the shield box. At 710, method 700 includes connecting an opposite end of the first cable to the RF power sensor.

At 712, method 700 includes controlling the computing device to send an RF signal from the test instrument through the calibration board to the RF power sensor. For example, in response to controlling the computing device in accordance with 712, the RF signal may be sent from the test instrument, pass through RF components and interconnecting cables normally present between test instrument and DUT, and also pass through the calibration board to the RF power sensor. As shown at 714, the RF signal may have requested transmission values including a power level. The computing device may be controlled in any suitable manner, including but not limited to by providing one or more input commands via one or more input devices. At 716, method 700 includes controlling the computing device to determine a difference between the requested transmission values and the measured transmission values. As shown at 718, the difference determined at 716 represents a path loss offset experienced by RF signals sent from the test instrument to the DUT. At 720, method 700 includes controlling the wireless device RF test station to store updated calibration values. As shown at 722, the updated calibration values may be derived from the difference between the requested transmission values and the measured transmission values. This process is repeated across the frequency band that the DUT is configured to operate and to be calibrated to obtain accurate individualized calibration values at each frequency.

As described above, current methods of calibrating a wireless device RF test station may result in a DUT being calibrated to an accuracy of +/−1.6 dB due to the accumulated uncertainties of the various components of the testing system used. In contrast, by utilizing a power meter that is self-calibrated with an uncertainty of +/−0.1 dB to calibrate a test instrument of the RF test station, the uncertainty of the RF test station is affected by the uncertainty of the power meter and the VSWR of cables throughout the system. Accordingly, the uncertainty of the RF test station can be brought down from +/−1.1 dB to approximately +/−0.25 dB, depending on the VSWR of cables and connections throughout the system. Taking into consideration the built-in uncertainty of +/−0.5 dB for integrated circuits of a DUT, the uncertainty of the DUT may be reduced from +/−1.6 dB to +/−0.75 dB when the RF test station is calibrated in accordance with the present disclosure.

Further, the integrity of connections and cables within an RF test station may be preserved by performing the calibration without disconnecting cables within the RF test station. The preserved integrity may also increase efficiency in the calibration process by reducing calibration time (e.g. from approximately twenty minutes to approximately five minutes), and by reducing an amount of training provided to the operator. Additionally, human error may be mitigated by deriving calibration values with a computing device (e.g., via one touch operation of the computing device), rather than deriving the values through manual entry by an operator. Furthermore, the power meter, power sensor, and portable computer may have a lower cost and be maintained more easily than a network analyzer that may be used in current calibration systems.

In some embodiments, the methods and processes described above may be tied to a computing system of one or more computing devices. In particular, such methods and processes may be implemented as a computer-application program or service, an application-programming interface (API), a library, and/or other computer-program product.

Figure 8:
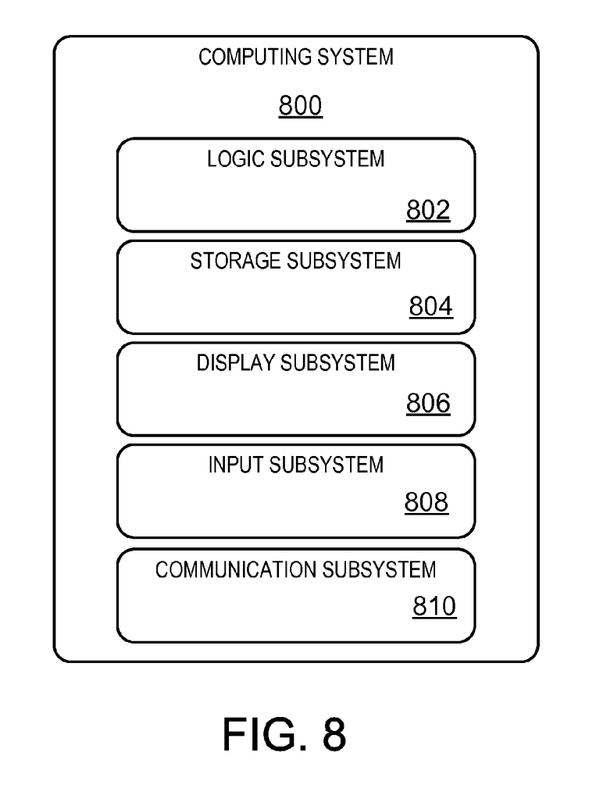
FIG. 8 shows a computing system in accordance with an embodiment of the present disclosure.

FIG. 8 schematically shows a non-limiting embodiment of a computing system 800 that can enact one or more of the methods and processes described above. Computing system 800 is shown in simplified form. It will be understood that virtually any computer architecture may be used without departing from the scope of this disclosure. In different embodiments, computing system 800 may take the form of a mainframe computer, server computer, desktop computer, laptop computer, tablet computer, home-entertainment computer, network computing device, gaming device, mobile computing device, mobile communication device (e.g., smart phone), etc.

Computing system 800 includes a logic subsystem 802 and a storage subsystem 804. Computing system 800 may optionally include a display subsystem 806, input subsystem 808, communication subsystem 810, and/or other components not shown in FIG. 8.

Logic subsystem 802 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result. For example, the instructions, when executed by the logic subsystem, may perform one or more aspects of the calibration process described in the present disclosure.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Storage subsystem 804 includes one or more physical, non-transitory, devices configured to hold data and/or instructions executable by the logic subsystem to implement the methods and processes described herein. When such methods and processes are implemented, the state of storage subsystem 804 may be transformed—e.g., to hold different data.

Storage subsystem 804 may include removable media and/or built-in devices. Storage subsystem 804 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 804 may include volatile, nonvolatile, dynamic, static, read/write, read-only, random-access, sequential-access, location-addressable, file-addressable, and/or content-addressable devices.

It will be appreciated that storage subsystem 804 includes one or more physical, non-transitory devices. However, in some embodiments, aspects of the instructions described herein may be propagated in a transitory fashion by a pure signal (e.g., an electromagnetic signal, an optical signal, etc.) that is not held by a physical device for a finite duration. Furthermore, data and/or other forms of information pertaining to the present disclosure may be propagated by a pure signal.

In some embodiments, aspects of logic subsystem 802 and of storage subsystem 804 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The term "program" may be used to describe an aspect of computing system 800 implemented to perform a particular function. In some cases, a program may be instantiated via logic subsystem 802 executing instructions held by storage subsystem 804. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage subsystem 804. This visual representation may take the form of a graphical user interface (GUI). As the herein described methods and processes change the data held by the storage subsystem, and thus transform the state of the storage subsystem, the state of display subsystem 806 may likewise be transformed to visually represent changes in the underlying data. Display subsystem 806 may include one or more display devices utilizing virtually any type of technology. Such display devices may be combined with logic subsystem 802 and/or storage subsystem 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, steroscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A portable radiofrequency (RF) test station calibration device, comprising:
 an RF power meter;
 a power sensor configured to connect to an RF test instrument of a wireless device RF test station through a calibration board, the RF test instrument being configured to test and calibrate one or more other RF devices under test; and
 a computing device configured to connect to the RF test instrument and to the RF power meter, the computing device comprising a logic subsystem and a storage subsystem, the storage subsystem storing instructions executable by the logic subsystem to:
  control the RF test instrument to transmit one or more RF signals having requested transmission values to the power sensor, the one or more RF signals being transmitted to the power sensor through each of a first path and a second path independently,
  wherein the first path extends from the RF test instrument to a first RF test instrument connector of the calibration board, to a first power sensor connector of the calibration board and to the power sensor, and the second path extends from the RF test instrument to a second RF test instrument connector of the calibration board, to a second power sensor connector of the calibration board and to the power sensor;
  and, for each of the first path and the second path,
  receive measured transmission values from the RF power meter, the measured transmission values measured from the RF signals received at the power sensor;
  determine a difference between the requested transmission values and the measured transmission values; and
  send a calibration value to the RF test instrument to be stored at the RF test instrument, the calibration value derived from the difference between the requested transmission values and the measured transmission values.

2. The portable RF test station calibration device of claim 1, wherein the wireless device RF test station is configured to test a plurality of devices under test (DUTs), and wherein the first and second RF test instrument connectors are positioned in locations on the calibration board corresponding to locations of RF connectors on the DUTs.

3. The portable RF test station calibration device of claim 2, wherein each of the first and second RF connectors connects to a blind mate connector positioned in a preselected location matching a connection location in the RF testing station to receive a cable from a power sensor.

4. The portable RF test station calibration device of claim 3, wherein the blind mate connectors are integrated with the wireless device RF test station.

5. The portable RF test station calibration device of claim 3, wherein the blind mate connectors are positioned at a location of the calibration board that correspond to a location of holes in a shield box of the wireless device RF test station when the calibration board is inside of the shield box.

6. The portable RF test station calibration device of claim 5, wherein each of the holes in the shield box comprises a closeable lid to cover the holes.

7. The portable RF test station calibration device of claim 1, wherein the requested transmission values include a requested transmission power level and the measured transmission values include a measured transmission power level.

8. On a computing device of a portable RF test station calibration device, a method of calibrating a wireless device radiofrequency (RF) test station, the wireless device RF test station including a test instrument configured to test and calibrate one or more other RF devices under test, and the portable RF test station calibration device including the computing device, an RF power meter and an RF power sensor, the method comprising:

controlling the test instrument to send an RF signal to the RF power sensor through a calibration board via a first path and a second path, the RF signal having requested transmission values, the RF signal being sent from the test instrument through the first path and the second path to the RF power sensor independently or simultaneously; and, for each of the first path and the second path, wherein the first path extends from the RF test instrument to a first RF test instrument connector of the calibration board, to a first power sensor connector of the calibration board and to the power sensor, and the second path extends from the RF test instrument to a second RF test instrument connector of the calibration board, to a second power sensor connector of the calibration board and to the power sensor;

detecting the RF signal via data received from the power sensor;

determining measured transmission values for the RF signal, the measured transmission values measured from the RF signal detected via data received from the power sensor;

determining a difference between the requested transmission values and the measured transmission values; and providing updated calibration values to the test instrument for storage at the test instrument, the updated calibration values being derived from the difference between the requested transmission values and the measured transmission values.

9. The method of claim 8, wherein the requested transmission values include a requested power level of the RF signal and the measured transmission values include a measured power level of the RF signal.

10. The method of claim 8, wherein the test instrument offsets a transmission power level by an amount corresponding to the updated calibration values.

11. The method of claim 8, wherein the wireless device RF test station is configured to test a device under test (DUT), wherein the calibration board has a same configuration as a board of the DUT.

12. The method of claim 8, wherein the first and second RF test instrument connectors are blind mate connectors.

13. The method of claim 12, wherein the first and second blind mate connectors are integrated with the wireless device RF test station.

14. The method of claim 13, wherein the RF signal is independently sent through the first path and the second path.

15. The method of claim 14, wherein the computing device of the portable RF test station device determines the updated calibration values from a difference between requested transmission values and measured transmission values across the first path and the second path, the test instrument offsetting a transmission power level by an amount corresponding to the updated calibration values.

16. A method of calibrating a wireless device radiofrequency (RF) test station with a portable RF test station calibration device, the wireless device RF test station including a test instrument and the portable RF test station calibration device including a computing device, an RF power meter and an RF power sensor, the method comprising:

controlling the computing device to send an RF signal from the test instrument through the calibration board to the RF power sensor via a first path and a second path, the RF signal having requested transmission values including a power level, wherein the first path extends from the RF test instrument to a first RF test instrument connector of the calibration board, to a first power sensor connector of the calibration board and to the power sensor, and the second path extends from the RF test instrument to a second RF test instrument connector of the calibration board, to a second power sensor connector of the calibration board and to the power sensor; and, for each of the first path and the second path, controlling the computing device to determine a difference between the requested transmission values and the measured transmission values; and controlling the wireless device RF test station to store updated calibration values, the updated calibration values being derived from the difference between the requested transmission values and the measured transmission values.

* * * * *